No. 608,551. Patented Aug. 2, 1898.
J. G. HOFFMAN & W. B. NORTON.
CASH REGISTER.
(Application filed June 11, 1897.)
(No Model.) 5 Sheets—Sheet 1.
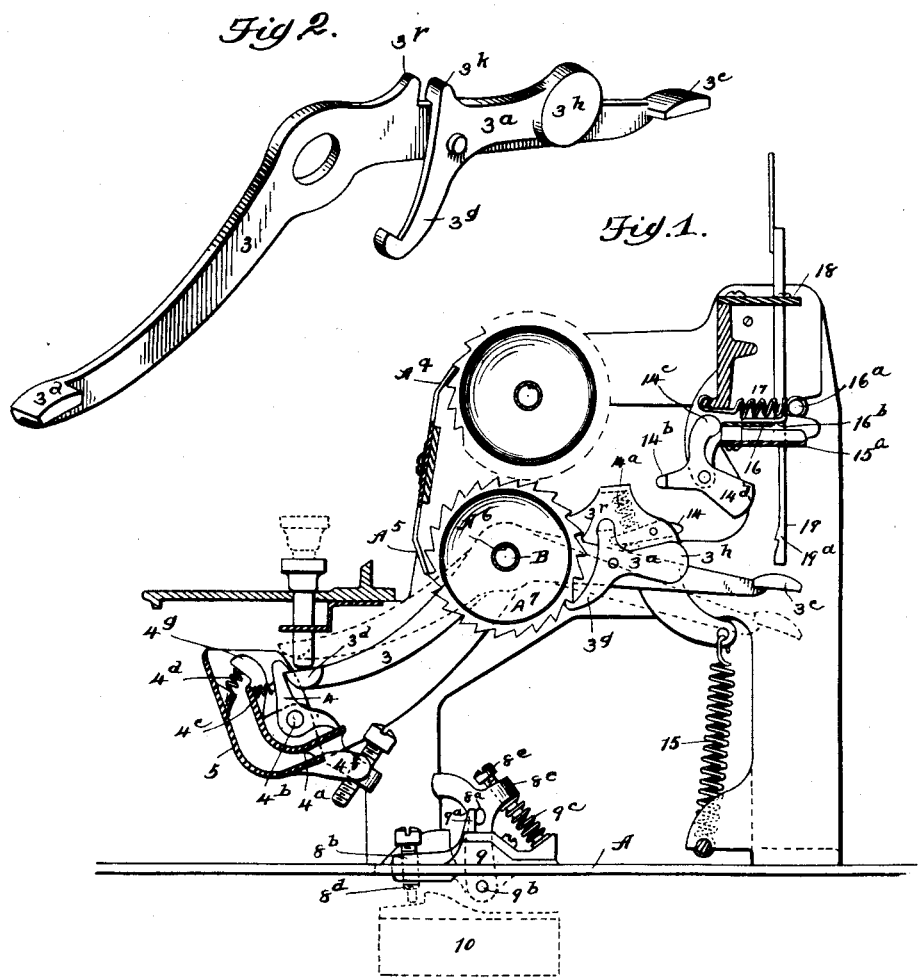

No. 608,551.  
Patented Aug. 2, 1898.

J. G. HOFFMAN & W. B. NORTON.
CASH REGISTER.
(Application filed June 11, 1897.)

(No Model.)  
5 Sheets—Sheet 2.

WITNESSES  
INVENTORS  
Jules G. Hoffman  
William B. Norton  
By Parker & Burton  
Attorneys.

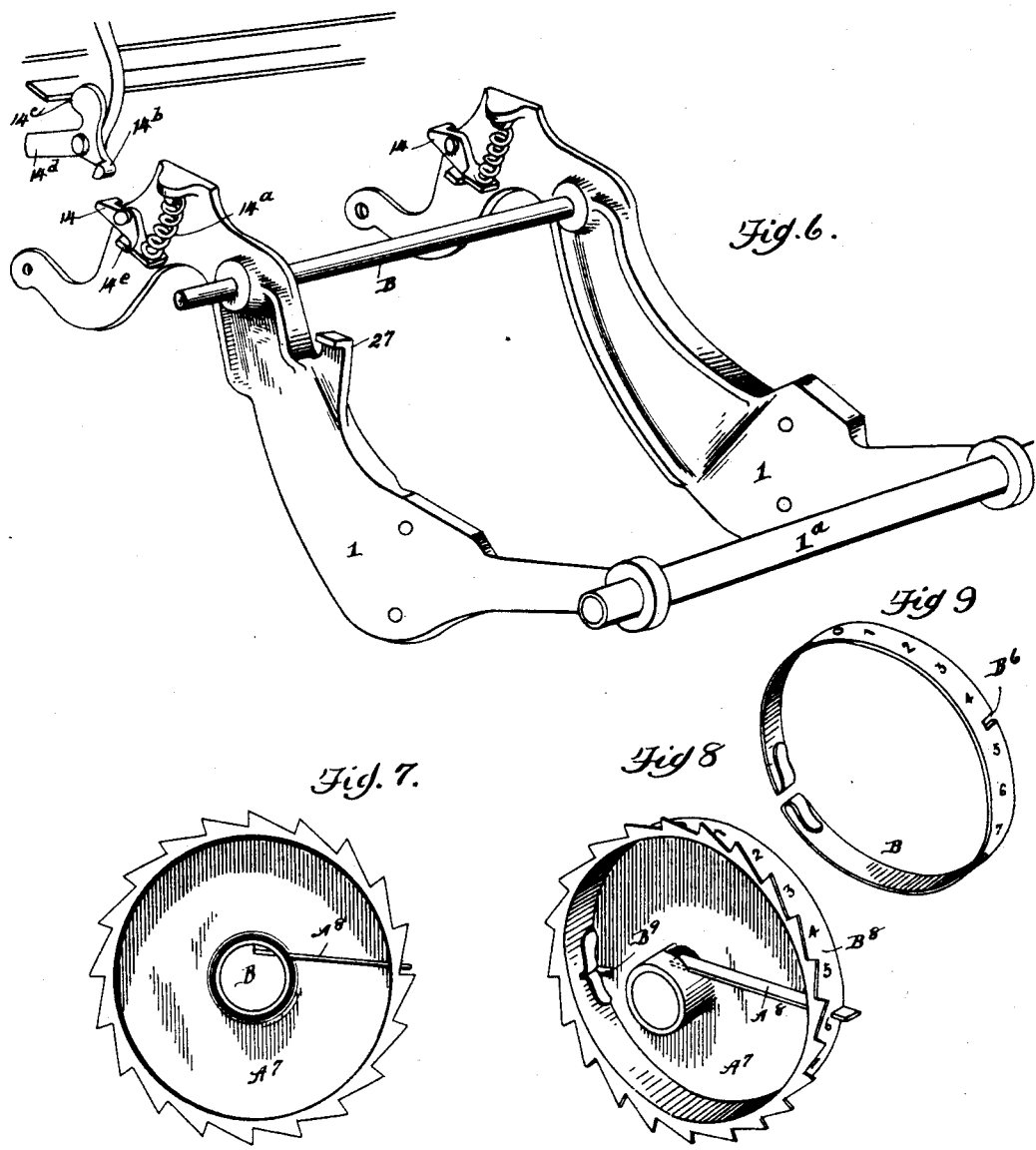

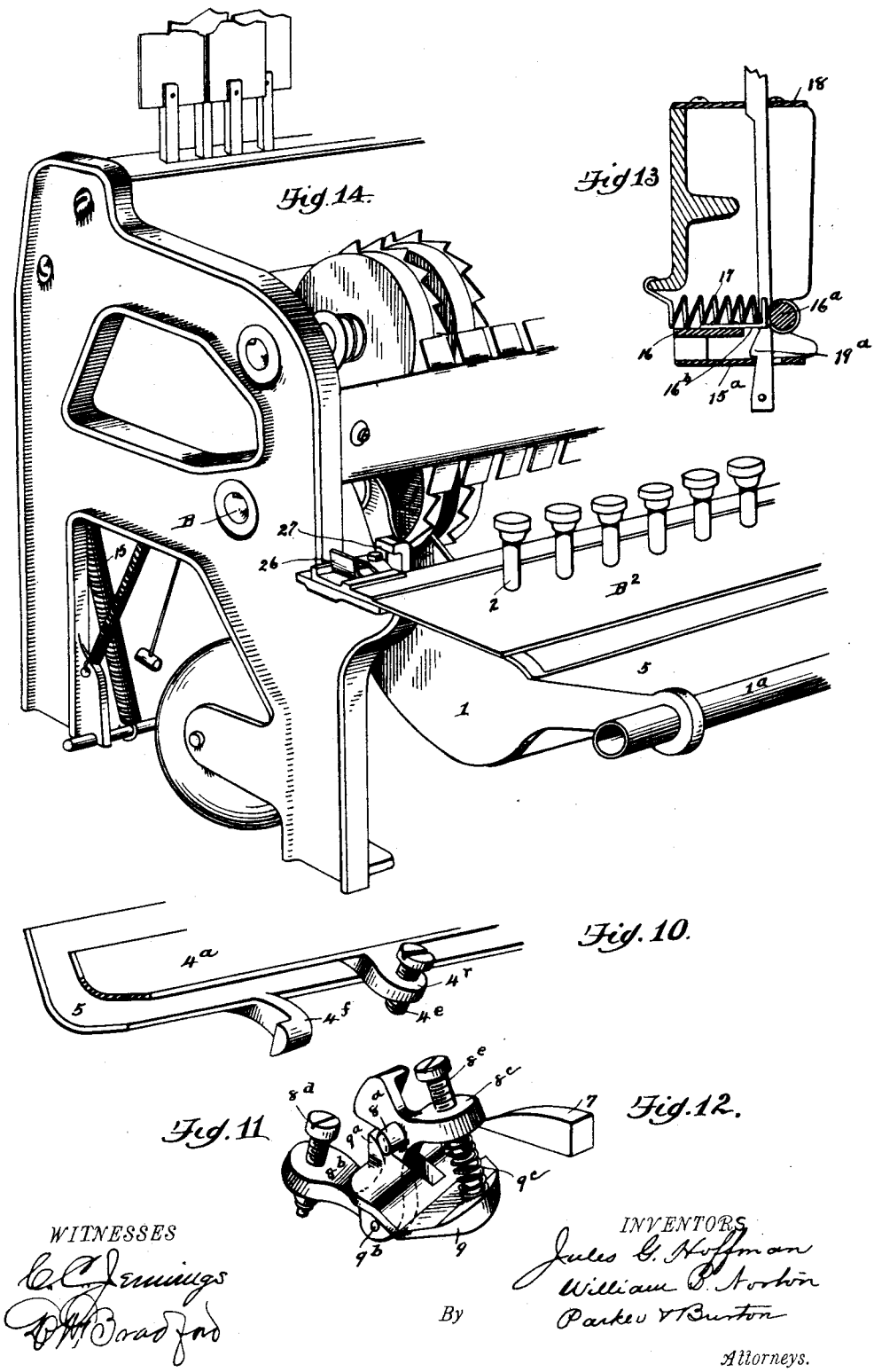

UNITED STATES PATENT OFFICE.

JULES G. HOFFMAN AND WILLIAM B. NORTON, OF DETROIT, MICHIGAN, ASSIGNORS TO THE AMERICAN CASH REGISTER COMPANY, OF SAME PLACE.

CASH-REGISTER.

SPECIFICATION forming part of Letters Patent No. 608,551, dated August 2, 1898.

Application filed June 11, 1897. Serial No. 640,291. (No model.)

*To all whom it may concern:*

Be it known that we, JULES G. HOFFMAN and WILLIAM B. NORTON, citizens of the United States, residing at Detroit, county of Wayne, State of Michigan, have invented a certain new and useful Improvement in Cash-Resisters; and we declare the following to be a full, clear, and exact description of the invention, such as will enable others skilled in the art to which it pertains to make and use the same, reference being had to the accompanying drawings, which form a part of this specification.

This invention relates to cash-registers of the class in which a certain amount called a "purchase" is indicated on tablets that are exposed to view at one part of the machine and registers on a wheel or train of wheels the detail addition of the sums indicated by each additional key.

Figures 3, 4:
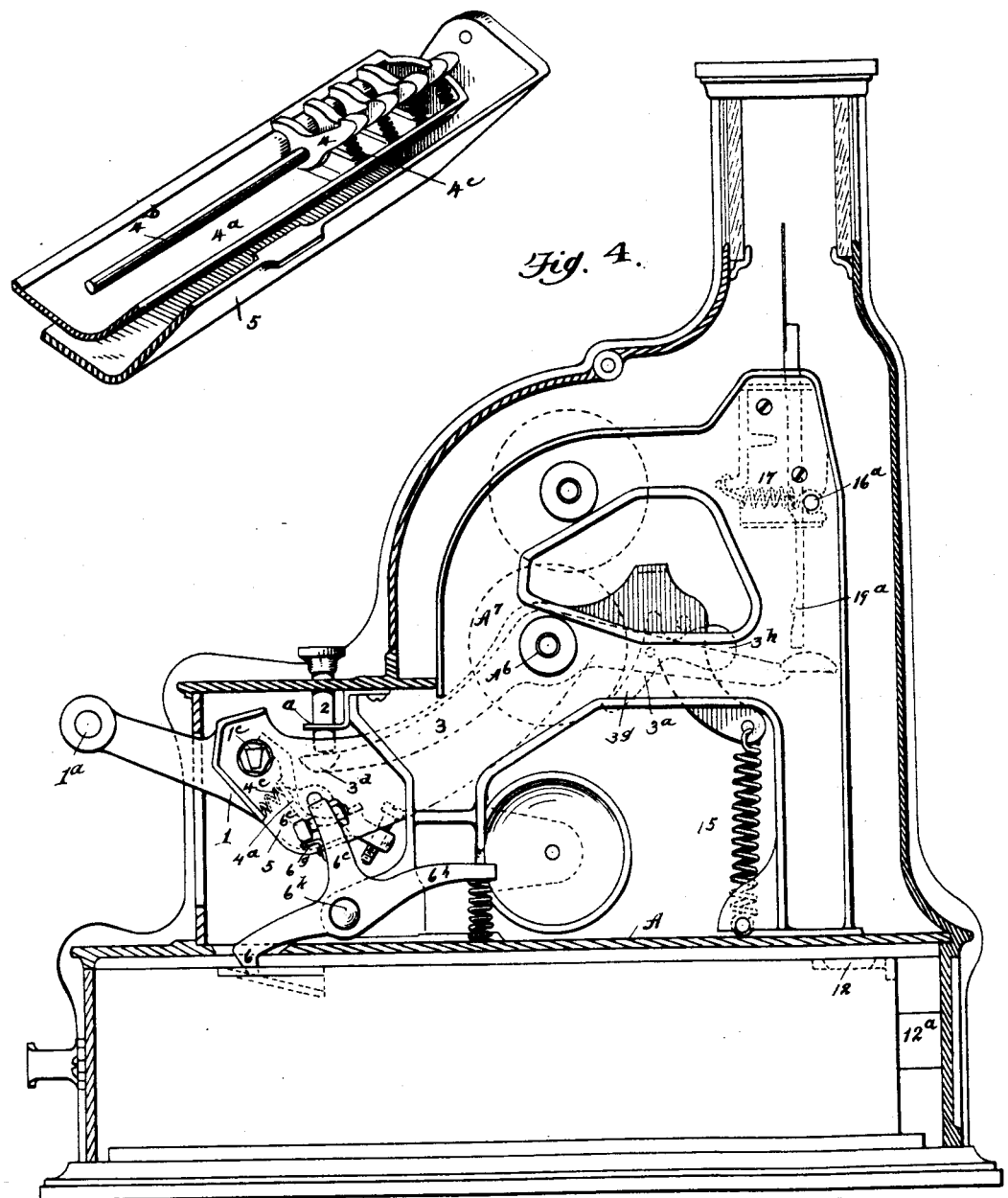
Figure 5:
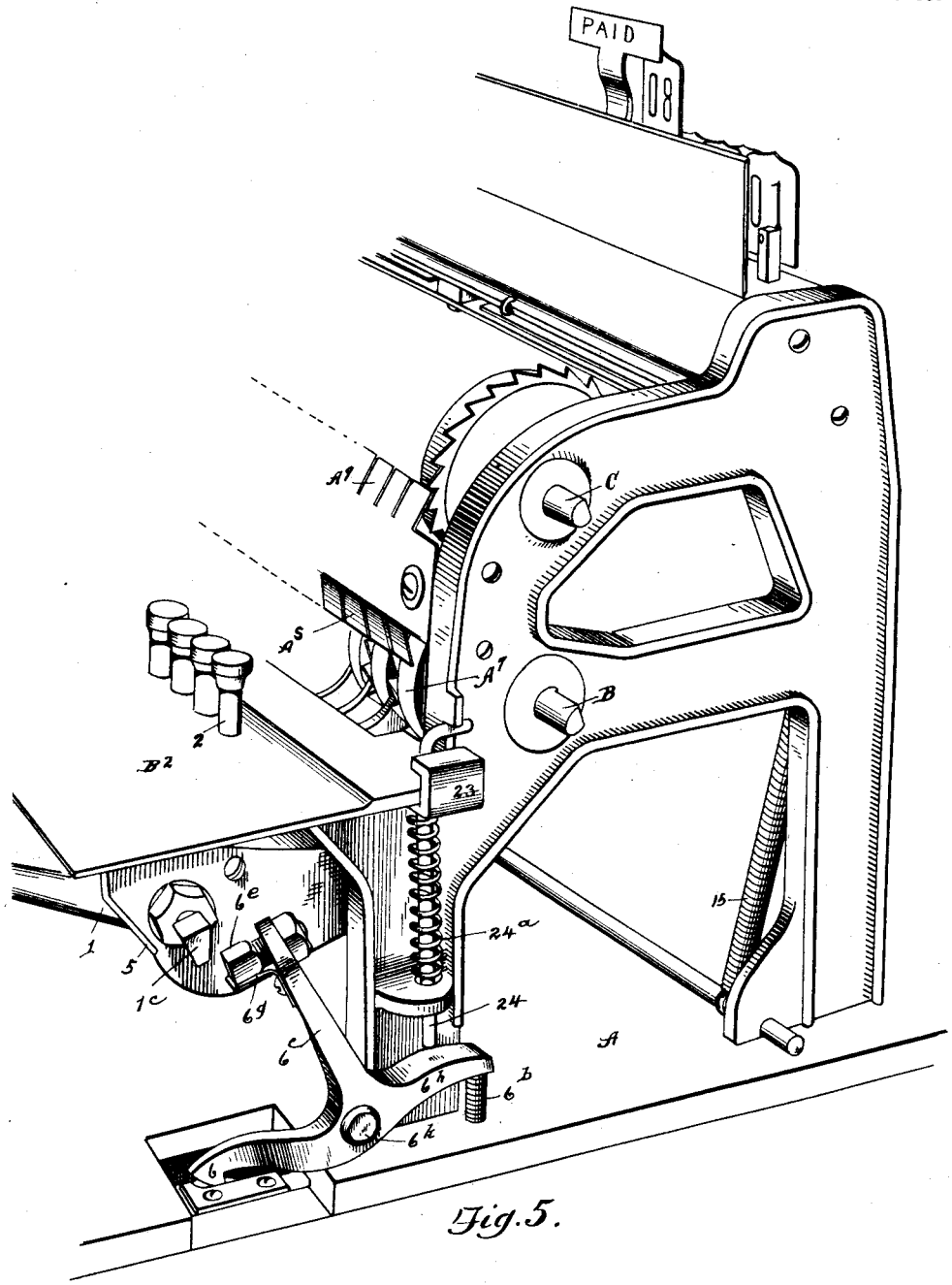

In the drawings, Figure 1 is a section through some of the parts which extend lengthwise of the framework and shows in elevation a single actuating-key, tablet-rod, and set of registering-wheels. It also shows other parts immediately connected with the above-mentioned parts. Fig. 2 is a detailed perspective of a primary key-lever. Fig. 3 is a section across the register and shows more particularly a complete-throw mechanism. Fig. 4 shows in perspective a cradle and dogs or catches strung on the rod on which the cradle is swung. Fig. 5 shows an end of the framework and shows the complete-throw mechanism, and means whereby the complete-throw machanism may be brought into or kept out of use. Fig. 6 shows in perspective the secondary levers used in connection with the primary levers. Fig. 7 shows in side elevation a register-wheel and its connection with the axle and indicates the way in which the register-wheels are all reset at the "0" points. Fig. 8 is a perspective of the same wheel. Fig. 9 shows detached the band on which the ordinal numbers for the registering-wheel are printed. Fig. 10 is a detail of the cradle and the cradle-bar and shows parts which are employed to actuate the unlocking device. Fig. 11 is a drawer-unlocking device. Fig. 12 is the stop employed to rock the cradle of Fig. 10 and unhook the catches from over the ends of the primary actuating-levers. Fig. 13 is a detail showing the means employed to hold the lifted tablet-rod. Fig. 14 is a perspective of an end view of the frame, showing the lock by which the register is locked when it is desired to prevent its use.

In this register the operator first pushes downward a finger key or stud that projects through a horizontal table at the front of the register. The lower and inner end of this finger-stud rests on the end of a primary actuating-lever that is hung on the main shaft of the register. This shaft serves as the fulcrum for the primary actuating-levers and the secondary actuating-lever, and on it are strung the lower order of registering-wheels. While the shaft serves as the fulcrum for the primary actuating-levers, they are not hung directly on this shaft, but each one of them is hung on the hub of the registering-wheel with which it is connected and which it actuates. The end of the primary actuating-lever pushed downward, as above mentioned, engages under the end of a hook, a number of which are strung on a fulcrum-rod that extends across from one to the other of the two side pieces of the secondary actuating-lever. The hooks are in a cradle, the use of which will be hereinafter described. After the primary actuating-lever has engaged under the hook it becomes practically so connected with the secondary actuating-lever that its further movement is in unison therewith. The operator next actuates the secondary actuating-lever, and this and the primary actuating-lever now connected with it lift the tablet-rod to a position where the tablet is exposed and where the rod is caught, so that the tablet is held in an exposed position. It also actuates the register-wheel, throws down the previously-exposed tablets, and at the end of its downward movement unhooks from and releases the primary actuating-lever and unhooks the drawer. There is also connected with the apparatus a complete-throw mechanism, compelling a complete cycle of movement after the initial movement has been started. There is also means whereby this complete-throw mechanism may be, if desired, made to be inoperative, so that the register may be used simply as a cash-drawer. In the completed register this latter adjustment is so inclosed within locked parts of the case that it can only be reached by one having a key to the interior part and cannot be used by others than those having such keys.

A indicates the base-plate on the frame which is above the drawer and which supports the various end frames necessary to furnish the bearings for the shafts of the register and for the rods which hold the frame together.

At the front, through a tubular part of the framework B², projects a pin 2, the upper end of which terminates with a properly-arranged button or plate, on which is printed a numeral or character or characters to indicate to the user its connection with a similarly-marked tablet and with registering-wheels that are adapted to register in accordance with the numeral or character at the end of the pin. The lower end of the pin passes through a steady-plate $a$ and rests on the front end of a primary actuating-lever 3. The front end 3$^d$ of the lever 3 is broadened or flattened in order that it may with certainty engage under the hook of a dog 4. The lever 3 is fulcrumed on the hub of the lower registering-wheel A⁷, and this registering-wheel A⁷ is one of a number that are strung on a rod or shaft A⁶, which passes from end to end of the framework. The lever 3 projects rearward and terminates with a broadened partially cylindrical terminal 3$^e$, the axis of curvature of which is across the axis of the shaft. The object of this curvature is to present a suitable tangent bearing connection between the terminal 3$^e$ and the lower end of the tablet-rod 19 through the entire extent of the engagement between the terminal and the tablet-rod when the tablet-rod is lifted, as hereinafter described.

To that end of the actuating-lever 3 which lies to the rear of the fulcrum and far enough removed back from the fulcrum to permit of its proper and free action is pinned a gravity-dog 3$^a$. The dog 3$^a$ has three branches, one of which, 3$^g$, terminates with a hook that is adapted to engage with the ratchet-teeth of the lower register-wheel A⁷, another of which, 3$^h$, is provided with a counterweight and so arranged with reference to the first that it tends at all times to hold the hook in engagement with the ratchet-teeth. The third of the prongs 3$^k$ reaches over the body of the lever 3 and engages behind a stop-lug 3$^r$ on that lever. The lever 3 and the dog 3$^a$, the one engaging on the axle and the other engaging with the teeth of the registering-wheel, furnish an actuating means for the registering-wheel which produces a step-by-step motion on that wheel. Retrograde motion of that wheel is prevented by a suitable pawl A⁵, affixed to the main framework.

At each end of the shaft B is hung a side lever of the secondary actuating-lever. (Shown in detail in Fig. 6, where the side levers are indicated by the character 1.) These side levers are united by a hand-bar 1$^a$, that extends from one to the other on the outside of the register-casing, through which the front ends of the side bars 1 extend. Near the front ends, but within the casing, the two side levers 1 are united by a stay bar or piece 5, (seen in Fig. 4,) which is angled or curved around and is secured to the two side levers 1, and within the cavity on the shaft 4$^b$ is hung a cradle-piece 4$^a$. This is an angled piece of metal suitably hung to the shaft and furnishing at one of its edges bearings for the feet of the angled hook-levers 4 and at the other of its edges bearings for springs 4$^c$, one of which engages by each hook-lever and the edge of the cradle. The cradle 4$^a$ is also provided with a bearing 4$^g$, (seen in Fig. 1,) adapted to engage with a spring 4$^d$, that rests between itself and the stay-piece 5. The spring 4$^d$ is stronger than the spring 4$^c$ or than several of the springs 4$^c$ for reasons which will be explained.

From the lower side of the cradle extends a lug 4$^r$, through which there is inserted a screw 4$^e$. The spring 4$^c$ holds the upper end of the hook pressed toward the end of the lever 3 and in position to engage the end of that lever. The hook is thrown inward until the foot of it rests on the edge of the cradle 4$^a$. The spring 4$^d$ holds the cradle with its upper edge pressed backward and with the lug 4$^r$ resting against the edge of the stay-piece 5. When the finger-pin 2 is pushed downward, the front end of the lever 3 engages under the hook 4, and the lever 3 is hooked to the secondary lever, to which it remains hooked until subsequently released. This primary actuation of the lever 3 does not set in movement either the tablet-rod or the registering-wheel, but simply brings into unison those of the levers 3 whose pins are depressed. The next movement by the operator is to push downward the hand-bar 1$^a$. This carries down the levers 1, and the lever 3 actuates the register-wheel, drops previously-lifted tablets, and lifts those whose primary actuating-levers are in engagement with the recording-lever. The register-wheel A⁷ is actuated by a dog 3$^a$, one branch of which, 3$^g$, engages successively with the teeth of the wheels, driving the wheels forward the space of one tooth with each complete revolution of the lever 3. The dropping of tablet-rods is effected by means which will be hereinafter described. The lifting of the tablet-rods is brought about by the action of the rear end of the lever 3 on the tablet-rod under which it engages and which the lever lifts bodily upward until the spur 19$^a$ on the tablet-rod passes through a hole in a holding-plate 15 and engages over the edge of it. Above the holding-plate 15$^a$ and at the rear of the rod is a round bar 16$^a$, held from rising or falling, but adapted to have a horizontal movement, the movement forward being under the impelling action of a spring 17, one end of which engages over the rod 16$^a$ and the other end of which engages with a fixed part of the frame. The movement backward of the rod 16$^a$ is produced by a pushing action of a horizontal bar 16, that extends endwise in front of the tablet-rod and is provided at two or three places with elbows 16$^b$, that reach to the rear of and between the tablet-rods and engage against the front side of the round rod 16$^a$. With the front of the sliding bar 16 engages a rock-lever, one end of which, 14$^c$, engages the sliding bar 16, and the inner end of which, 14$^d$, is a weight-arm, and the third arm of which, 14$^b$, engages a slip-tooth or slip-lever 14 on the rear end of the side lever 1. The slip-lever 14 is pivoted to the side lever 1. The rear end of it can move downward independently of the lever 1, but is held up with respect to the lever 1 by a spring 14$^a$. The inner end, or that end which is toward the front of the lever 1, engages over a lug 14$^e$, so that the rear end cannot move upward with respect to the lever 1, but only in unison therewith. When the rear end of the lever 1 is lifted by the depression with the front end, the end of the slip-lever 14 engages with the end 14$^b$ of the rock-lever, tilts the rock-lever, pushes back the plate 16 and the rod 16$^a$, and the plate, engaging the body of the lifted tablet-rods, pushes the tablet-rods back, disengaging the spur 19$^a$ from the rest 15$^a$ and the tablet-rod drops. This is timed to occur before the rear end of the lever 3, now in engagement with the secondary lever, has terminated its upward movement, carrying up the tablets which are to be newly exposed. After the rock-lever has been actuated as previously described the lever 14 slips by it, and on the downward movement of the rear end of the lever 1 the lever 14 easily slips by the end of the rock-lever 14$^b$. Springs 15 normally hold the rear end of the levers 1 depressed.

Above the drawer, in a location suitable to be properly actuated by the lug 4$^f$, that projects rearward and downward from the stay-piece 5, is the locking-bolt of the drawer-lock. This locking-bolt consists of a bell-crank lever or rock-lever with three branches, suitably held by a pin 9$^b$ to a base-fixture 9. One branch, 8$^b$, of the rock-lever extends in front of the catch 10 on the drawer and is provided with an adjustable screw 8$^d$, that serves as the true bolt to engage the catch 10. Another branch of the rock-lever extends up to a position proper to engage the lug 4$^f$, and a third branch, 8$^c$, extends to the rear and is provided with an adjusting-screw 8$^e$, arranged to limit the backward and downward movement of the rock-lever and to adjust the limit to which it may be rocked. A spring 9$^c$, engaging by the holding-plate 9 to the arm 8$^c$ of the rock-lever, tends to hold the arm 8$^c$ forward and upward and the arm 8$^b$ and screw 8$^d$ forward, with the screw in locking engagement with the catch 10. The forward rock of this lever is limited by engaging lugs 8$^a$ and 9$^a$, one of which is on the lever and the other of which is on the plate 9. The interlocking of the bolt and catch of the drawer does not prevent the drawer from being pushed backward a short distance against the elliptical spring 12$^a$, that lies at the rear of the drawer and tends to hold the drawer forward with the catch in close engagement against the back of the bolt. The slight inward or backward movement of the drawer is required to release the complete-throw mechanism, which until the drawer is fully closed holds the secondary actuating-lever 1 with its front end slightly depressed, although the front ends of the primary actuating-lever 3 were released from under the hook of the catch 4 during the period of the downward movement of the front end of the lever 1 and just previous to the time that the stay-piece 5 engaged with and actuated the drawer-lock. The complete-throw mechanism just referred to consists of a three-armed lever (shown most clearly in Fig. 5) having the branches 6 6$^c$ 6$^h$. It is held to the frame by a pin 6$^k$, on which it rocks. The branch 6 extends forward, curves downward or reaches downward to a position to engage with the slanting or oblique track on the top of the drawer, and terminates in the hook, which is adapted to engage with the counter-hook 12 at the rear of the drawer. This latter engagement does not enter into its function as a complete-throw mechanism, but simply utilizes this branch of the lever, which extends down into engagement with the drawer, to prevent the complete withdrawal of the drawer from its case. The slight backward movement of the drawer after it has been pushed in far enough to enable the locking-bolt to engage and hold it locked lifts the front end of the lever 6 by sliding the oblique track under it. This rocks backward the branch 6$^c$, which reaches upward and pushes the head of the screw 6$^e$ back from over a catch 1$^c$, that extends sidewise from the lever 1. A branch 6$^h$ of the lever engages over a spring 6$^b$, that tends to hold the branch 6$^c$ forward to its proper position for engagement with the catch 1$^c$. The catch 1$^c$ is somewhat wedge-shaped, with the broad end of the wedge upward, and the narrow or pointed end of the wedge lies to the bottom and to the front, so that when the lever 1 is pushed downward that corner which is at the bottom and nearest to the screw 6$^e$ passes below the upper front edge of the screw-head without engaging it, and the continued downward movement of the front end of the lever 1 causes the catch and the screw to engage and the screw to yield backward until the catch has passed below it and the spring 6$^g$, which lies against its under side. As soon as the catch has passed below the spring the upper end of the arm 6$^e$ swings forward, engages over the catch, and prevents the lever 1 from returning upward until the arm 6ᶜ has been tilted backward again by the inward movement of the drawer, as previously described.

If it be desired to use the register as a simple drawer for holding money, the complete-throw mechanism may be thrown out of use by tilting the arm 6ᶜ back and arranging to hold it back. Means to produce this result are shown in the bent rod 24, suitably held to the case and held upward by a spring 24ª to a position such that it does not interfere with the work of the complete-throw mechanism. If, however, this rod 24 be pushed downward, turned on its axis slightly, and the end engaged under the loop or lug 23, it will then hold the upper end of the arm 6ᶜ where it will not engage with the catch 1ᶜ. The same rod 24 is used for the purpose of disengaging the hook on the arm 6 from the hook 12.

The registering-wheels are two in number for each register-key and are arranged so that one is of a lower and the other of a higher order. They are similar in construction, with the exception that the wheels of lower order which engage with the pawl of the primary actuating-key are each provided with a single tooth that actuates the wheel of the higher order connected with the same key. They are similarly arranged, each set on its own shaft, and are provided with means by which all the wheels of an order—that is, all the wheels strung on one shaft—are reset by a single rotation of the shaft. The resetting mechanism will be understood by referring to Figs. 5, 7, and 8. Fig. 5 shows the ends of the shafts B and C extending through the end frame and terminating with a slabbed-off part adapted to receive the eye of the crank or key. The body of the shaft is provided with a longitudinal V-shaped groove, with one wall of the groove coinciding substantially with the radius and the other coinciding substantially with a chord of the circumference of the shaft.

In the hub of each wheel is a slot, and from the hub there extends inward through its walls and into the V-shaped slot the end of a spring-pawl.

In the lower order of wheels the other end of the spring-pawl is passed through the periphery of the wheel and extends far enough outside the periphery to be utilized as a tooth to actuate the register-wheel of the second order once at every revolution of a wheel of the first order. Another use of the projecting end of the spring-pawl 8 common to both orders is to hold to the barrel a strip of metal on which are printed the numbers employed as register-numbers. The inner end of the spring-pawl $A^8$ projects through the slot in the hub and sometimes rests in the V-shaped groove and at other times rests on the surface of the shaft. The wheel of either order thus engaged on its shaft can rotate freely in the direction proper for its work in registering. It is held from rotation in the other direction ordinarily by pawls $A^5$ and $A^9$, (shown in Fig. 1,) and if it be desired to rotate the wheels to reset them a key is placed on the end of the shaft and the shaft is turned in the direction it is desired to have the wheels turn—that is, forward in the same direction they move when registering. A single rotation of the shaft suffices to bring all of the pawls $A^8$ into engagement with the radial face of the V-shaped groove and turn all of the wheels to bring ordinal numbers of the same value in alinement across the register-point. The shaft may be given any number of turns, as all the wheels will rotate in unison with their zero-points in line after one complete rotation is had.

In setting the machine the wheels are rotated until the line of zeros across the lower bank of wheels shows immediately below the ends of the pawls $A^5$ and the wheels of the upper bank are rotated until the line of zeros shows immediately above the pawls $A^9$.

26 indicates a locking-slide adapted to engage with a hook 27 on the lever 1. This locking-slide 26 is suitably secured to the main framework and lies within the casing, where it can be reached only by one who can have access to the interior of the casing, and the use of the lock is to place the register in such a condition that it cannot be actuated at all if it be desired to so place it.

$B^8$ shows the printed band employed with the registering-wheels. This is a band of light sheet metal, preferably coated with enamel and having the proper numerals printed thereon. The ends of it are inturned through a saw-kerf $B^9$, that is made in the wheel, and that part of the ring which lies opposite the inturned ends—that is, one hundred and eighty degrees away therefrom—is held from escape from the periphery of the wheel by the protruding end of the spring $A^8$. If the band is so wide that it more than fills the space between the teeth and the end of the spring $A^8$, a notch $B^6$ is cut in the band and the parts are easily assembled and securely held.

The spur of each tablet-rod projects from the body of the rod, so that both above and below the spur the distance from front to rear through the rod is less than it is at the spur, and when in the operation of dropping tablets that have been previously lifted the rod is pushed backward by the push-bar 16 enough to force the spur off from the foot-plate. There is space enough between the pressure-bar 16ª and the foot-plate to allow the tablet-rod to drop until its broader upper end engages on the upper holding-bar 18. There is at all times between the pressure-bar 16ª and the push-plate 16 space enough to permit the easy movement of the tablet-rod either up or down between them. The upper side of the spur is scarfed off, so that in its upward movement the tablet-rod engaging with the spur under the foot-plate and with the back of the rod against the pressure-bar 16ª separates the two when the rod is forced upward by the end of the lever 3.

What I claim is—

1. In a cash-register employing indicators, in combination with a primary actuating-lever entirely inclosed within the case adapted to engage the tablet-rods, a means for producing a limited initial movement of said lever, a secondary lever having a common fulcrum with the primary lever, and means for coupling the primary and secondary levers together, substantially as described.

2. In a cash-register employing indicators, the combination of a plurality of primary actuating-levers each of which is adapted to engage its own tablet-rod, a secondary lever having a common fulcrum with the primary levers, and means for coupling any one of the primary levers to the secondary lever, substantially as described.

3. In a cash-register employing indicators, the combination of a plurality of primary actuating-levers each of which is adapted to engage its own tablet-rod, means for producing an initial movement of each lever, a secondary actuating-lever having a common fulcrum with the primary levers and independent means for coupling each primary lever to the secondary lever, substantially as described.

4. In a cash-register employing tablet-indicators, the combination of a primary lever, means for producing an initial movement of the primary lever, a secondary lever having a common fulcrum with the primary lever, means for coupling the primary and secondary levers, and means for automatically releasing the coupling, substantially as described.

5. In a cash-register employing tablet-indicators, the combination of a plurality of primary levers, means for giving to any one of the actuating-levers an initial movement, a secondary lever having a common fulcrum with the primary levers, means for independently coupling any of the primary levers to the secondary lever, and means whereby the coupling between the levers is disengaged, substantially as described.

6. In a cash-register in combination, a primary actuating-lever, a secondary lever, a pivoted catch pinned to one of said levers and adapted to engage the other, a pivoted cradle pinned to the other of said levers and arranged to actuate the pivoted catch in both directions whereby it operates to both engage and disengage the said catch, substantially as described.

7. In a cash-register, a plurality of primary actuating-levers and a secondary lever which must be actuated in order that the primary levers may actuate the tablet-rods, a plurality of catches carried by the secondary lever and adapted to couple the primary levers thereto, a cradle carried by the secondary lever and adapted to be rocked with respect thereto and to engage the catches and uncouple the two levers, substantially as described.

8. In combination with a pair of levers on a common fulcrum and adapted to be coupled together, one of said levers being entirely inclosed and arranged to receive a sufficient initial impulse to effect the coupling but not sufficient to display the tablet-rod, and the second of which is adapted to have a complete throw but is not adapted to actuate the tablet-rod unless the first is coupled to it, substantially as described.

9. In a cash-register, the combination of two levers on a common fulcrum one of which is adapted to actuate the tablet-rod when coupled to, and itself actuated by the second lever, means for uncoupling the first from the second, and means whereby the relative time of the uncoupling with respect to the throw of the second lever may be adjusted, substantially as described.

10. In combination with a pair of levers mounted on a common fulcrum, a means whereby a short initial movement can be given to one of said levers, an angled pivoted hook pinned to the other of said levers and adapted to engage the first and couple the levers together, a cradle swung on the hook-pivot having spring contact with the hook on one side of the pivot and adapted to have direct contact with the hook at the other side of the pivot, substantially as described.

11. In a cash-register in combination with the cash-drawer, a lever employed to actuate and lift the tablet-rods, a pivoted locking-lever provided with two adjustable arms, one of which extends into the path of some part of the drawer, and the other of which is arranged to regulate the throw of the pivoted locking-lever, substantially as described.

12. In a cash-register employing indicating-tablets, a pair of levers, one of which is located entirely within the case and is adapted to have an initial movement when actuated by a detached finger-key, and the other of which is adapted to have a full movement, and both of which must be coupled before the tablet can be fully actuated thereby, means for coupling the two levers together, a complete-throw mechanism adapted to engage said levers, means for releasing the coupling of the two levers after the engagement between the levers and the complete-throw mechanism is effected and after the exposure of the tablet has been produced, but before the complete throw of the levers has been finished, substantially as described.

13. In a cash-register employing indicating-tablets and provided with a drawer, the combination of a lever entirely inclosed and a second lever partly inclosed, and which must be coupled to the first to enable the first to actuate the tablet-rods, a catch adapted to engage one of said levers and to be itself thrown out of its position of engagement with said lever by the closing of the cash-drawer, substantially as described.

14. In a cash-register employing tablets, a pair of levers one of which is adapted to engage and actuate the tablet, and the other of which is adapted to be coupled to and actuate the first, means adapted to uncouple the two levers and a drawer-lock adapted to be subsequently actuated by the second of the two levers, substantially as described.

15. In a cash-register, the combination of two levers one of which is entirely inclosed in the case and is adapted to actuate a register-wheel when coupled to and itself actuated by the second lever, means for uncoupling the first from the second before the end of the throw of the secondary lever and means whereby the relative time of the uncoupling with respect to the throw of the second lever may be adjusted, substantially as described.

16. In a cash-register, the combination of a pair of levers adapted to be coupled together, a register-wheel journaled on the fulcrum-shaft common to both said levers, one of said levers being adapted to receive a sufficient initial impulse to effect the coupling but not sufficient to actuate the register-wheel pertaining to said lever, and the second of said levers being adapted to have a complete throw but not being adapted to actuate the register-wheel unless the first is coupled to it, substantially as described.

17. In a cash-register, the combination of a plurality of primary actuating-levers entirely inclosed in the case, each of which is adapted to actuate a register-wheel proper to itself, means projecting through the casing for producing an initial movement of each primary lever, a secondary actuating-lever, and independent means for coupling each primary lever to the secondary lever, substantially as described.

18. In a cash-register, the combination of a plurality of primary actuating-levers entirely inclosed in the case, a plurality of register-wheels, a pawl coupling each actuating-lever to its proper register-wheel, a secondary lever, means projecting through the case for producing a limited initial movement of each primary lever, and independent means for coupling any one of the primary levers to the secondary lever, substantially as described.

19. In a cash-register, the combination of a primary actuating-lever, a registering-wheel and a secondary lever on a common journal, a ratchet connection between the registering-wheel and the primary lever, means projecting through the case for producing a limited initial movement of said primary lever, and means for coupling the primary and secondary levers together, substantially as described.

20. In a cash-register, in combination with actuating-levers and a complete-throw mechanism, a cut-out mechanism adapted to hold the complete-throw mechanism in position to prevent its engaging the actuating-levers, substantially as described.

21. In a cash-register, in combination with a complete-throw mechanism provided with a hook and adapted to interlock with the drawer to prevent the withdrawal of the drawer from its pocket, a rod arranged to lift the locking part of said complete-throw mechanism and hold it out of interlocking position, substantially as described.

22. In a cash-register, tablet-rods, means adapted to expose them, a foot-plate, a push-plate, a bar independent of the push-plate and adapted to engage with pressure behind the tablet-rods, and means independent of the pressure-bar actuated by the tablet-actuating mechanism adapted to relieve the tablet-rods from the pressure of the bar and to push the rods off the foot-plate, substantially as described.

23. In a cash-register employing tablet-indicators, the combination of tablet-rods, means for lifting the same, a foot-plate adapted to engage under a spur on each tablet-rod, a spring-pressed bar engaging the rods on the side opposite said spur and adapted to press the rods forward with the spurs engaging over the foot-plate, a push-bar adapted to engage said tablet-rods and the said pressure-bar, and means for actuating the push-bar, substantially as described.

24. In a cash-register, a tablet-rod provided with a projecting spur, a foot-plate adapted to engage under the spur, a pressure-bar adapted to engage behind the tablet-rod, a push-bar adapted to engage the pressure-bar and also to engage the body of the tablet-rod, the spacing between the push-bar and the pressure-bar being greater than the thickness of the tablet-rod, substantially as described.

25. As a means for engaging a printed band to the periphery of a registering-wheel, the combination of a slot in the wheel adapted to receive the ends of said band, and a spring adapted to engage the shaft and wheel for resetting purposes and provided with a projecting end adapted to engage the band and prevent it from moving on the longitudinal axis of the wheel, substantially as described.

26. In a cash-register, in combination with a common lever adapted to be coupled to any one of the several tablet-actuating levers, a locking-bolt attached to the register-frame adapted to interlock with said common lever, a projection on the drawer adapted to actuate the locking-bolt and release the lever substantially as described.

27. In a cash-register in combination with a registering-wheel provided with a slotted periphery, a printed band bent around the periphery of the wheel and with its ends extending through said slot, a piece extending radially outside the periphery of said wheel adapted to engage the band and prevent it from moving along the horizontal axis of the wheel, substantially as described.

28. In a cash-register, in combination with a register-wheel of lower order a grooved shaft and a register-wheel of higher order, a strip of sheet metal extending radially across the wheel, one end engaging in the groove of the shaft and the other extending through the periphery of the wheel of lower order and adapted to engage as a tooth with the wheel of higher order, substantially as described.

In testimony whereof we sign this specification in the presence of two witnesses.

JULES G. HOFFMAN.
WILLIAM B. NORTON.

Witnesses:
CHARLES F. BURTON,
VIRGINIA M. CLOUGH.